US008297691B2

(12) United States Patent
Huth et al.

(10) Patent No.: US 8,297,691 B2
(45) Date of Patent: Oct. 30, 2012

(54) ROOF LINER STIFFENER FOR A VEHICLE

(75) Inventors: Sarah J. Huth, Dublin, OH (US);
Shinichi Yamase, Dublin, OH (US)

(73) Assignee: Honda Motor Company, Ltd., Tokyo (JP)

(*) Notice: Subject to any disclaimer, the term of this patent is extended or adjusted under 35 U.S.C. 154(b) by 367 days.

(21) Appl. No.: 12/755,641

(22) Filed: Apr. 7, 2010

(65) Prior Publication Data

US 2011/0248528 A1    Oct. 13, 2011

(51) Int. Cl.
*B60J 7/00* (2006.01)
(52) U.S. Cl. .......................... 296/214; 248/65
(58) Field of Classification Search .................. 296/214; 248/65, 72, 73
See application file for complete search history.

(56) References Cited

U.S. PATENT DOCUMENTS

| 4,871,134 A | 10/1989 | Oikawa |
| 4,953,801 A | 9/1990 | Oikawa |
| 5,362,018 A | 11/1994 | Darr et al. |
| 6,120,091 A * | 9/2000 | Reich et al. ................... 296/214 |
| 6,827,316 B1 | 12/2004 | Arai |
| 7,312,399 B2 | 12/2007 | Girot |
| 2009/0173843 A1 | 7/2009 | Penner |

* cited by examiner

*Primary Examiner* — Joseph Pape
(74) *Attorney, Agent, or Firm* — Ulmer & Berne LLP

(57) ABSTRACT

A roof liner stiffener includes a rail and a first guide member. The rail is configured for attachment to a roof liner of a vehicle and includes a web and a plurality of ribs integral with the web. The first guide member is configured to support a first portion of an electrical wiring harness of a vehicle. The rail and the first guide member are integrally formed from a thermoplastic material as a unitary structure. The first guide member includes a first base and an elongate arm integral with, and extending away from, the first base. The elongate arm of the first guide member is bendable relative to the first base of the first guide member. Roof liner assemblies and vehicles are also provided.

26 Claims, 8 Drawing Sheets

ROOF LINER STIFFENER FOR A VEHICLE

TECHNICAL FIELD

A roof liner stiffener is configured to support an electrical wiring harness of a vehicle.

BACKGROUND

Some conventional vehicles include an electrical wiring harness extending between a roof and a roof liner of the vehicle. The electrical wiring harness is attached to the roof liner using tape and also using two-piece clips. A first piece of each clip is glued to the roof liner and a second piece of each clip is taped to the electrical wiring harness and is snapped into the respective first piece.

SUMMARY

According to one embodiment, a roof liner stiffener for a vehicle includes a rail and a first guide member. The rail is configured for attachment to a roof liner of a vehicle, and includes a web and a plurality of ribs integral with the web. The first guide member is configured to support a first portion of an electrical wiring harness of a vehicle. The rail and the first guide member are integrally formed from a thermoplastic material as a unitary structure. The first guide member includes a first base and an elongate arm integral with, and extending away from, the first base. The elongate arm of the first guide member is bendable relative to the first base of the first guide member.

According to another embodiment, a roof liner assembly for a vehicle includes a roof liner and a roof liner stiffener assembly attached to the roof liner. The roof liner stiffener assembly includes a roof liner stiffener. The roof liner stiffener includes a rail attached to the roof liner. The rail includes a web and a plurality of ribs integral with the web. The roof liner stiffener also includes a first guide member that is configured to support a first portion of an electrical wiring harness of a vehicle. The rail and the first guide member are integrally formed from a thermoplastic material as a unitary structure. The first guide member includes a first base and an elongate arm integral with, and extending away from, the first base. The elongate arm of the first guide member is bendable relative to the first base of the first guide member.

According to another embodiment, a vehicle includes a roof liner, a roof liner stiffener assembly attached to the roof liner, an electrical component, and an electrical wiring harness in electrical communication with the electrical component. The roof liner stiffener assembly includes a roof liner stiffener. The roof liner stiffener includes a rail attached to the roof liner. The rail includes a web and a plurality of ribs integral with the web. The roof liner stiffener further includes a first guide member. The first guide member supports a first portion of the electrical wiring harness. The rail and the first guide member are integrally formed from a thermoplastic material as a unitary structure. The first guide member includes a first base and an elongate arm integral with, and extending away from, the first base. The elongate arm of the first guide member is bendable relative to the first base of the first guide member.

BRIEF DESCRIPTION OF THE DRAWINGS

Various embodiments will become better understood with regard to the following description, appended claims and accompanying drawings wherein:

DETAILED DESCRIPTION

Figure 1:
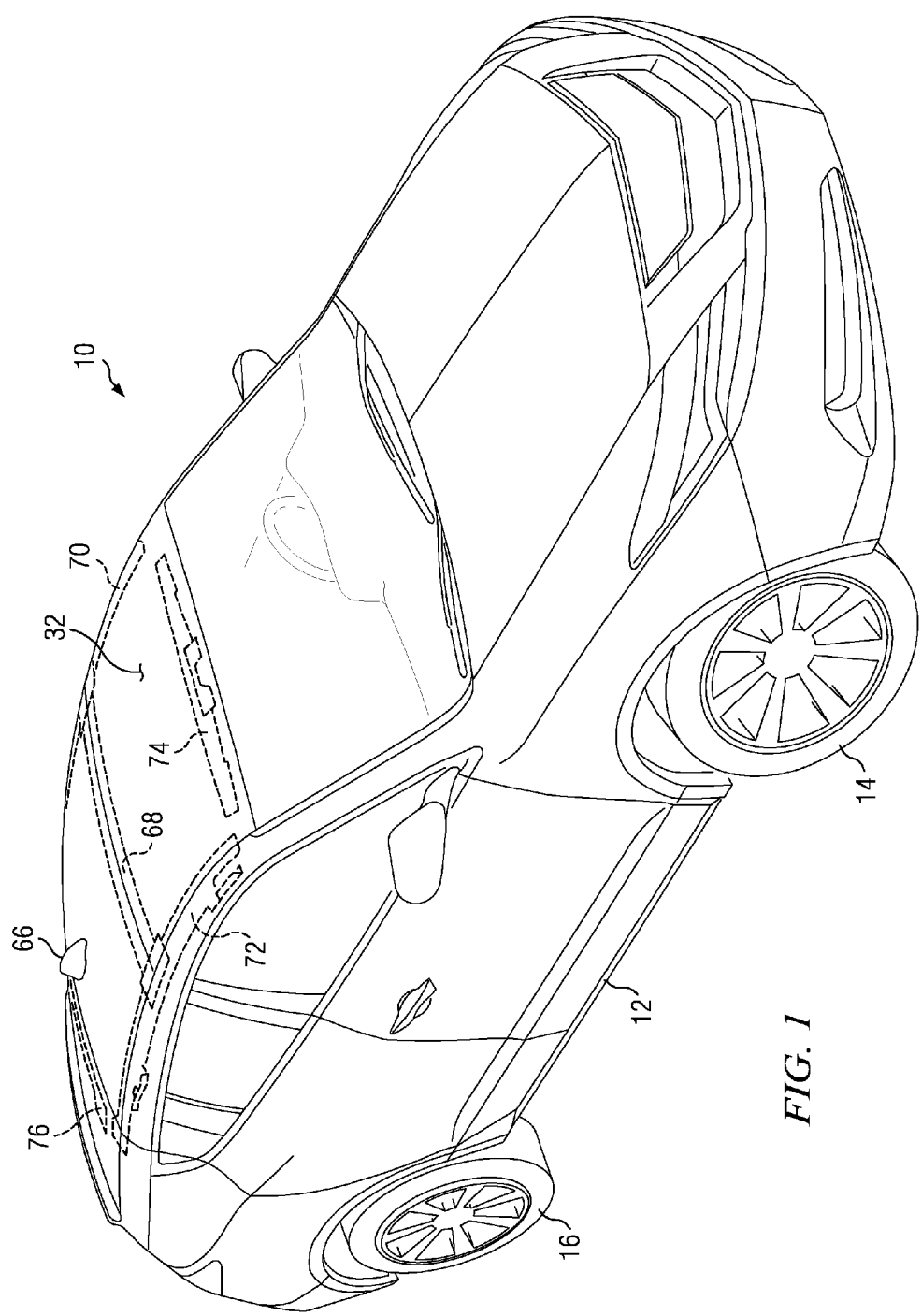
FIG. 1 is a perspective view depicting a vehicle that includes a roof liner stiffener assembly, depicted in dashed lines in FIG. 1 and with certain details omitted for clarity of illustration, according to one embodiment.

Referring to the drawings, wherein like reference numbers indicate the same or corresponding elements throughout the views, FIG. 1 illustrates a vehicle 10, which is shown to be an automobile. Vehicle 10 can include a frame 12, which can be configured as a unibody construction, and various body panels and other structures (e.g., doors) attached to and/or supported by the frame 12. The vehicle 10 can also include a pair of front wheels 14 (one shown) and a pair of rear wheels 16 (one shown). Wheels 14 and 16 can be suspended from the frame 12 and can be rotatable relative to the frame 12. Vehicle 10 can further include a source of motive power (not shown), which can be an internal combustion engine and/or one or more electric motors or any other suitable source of motive power. The source of motive power can be coupled to the front wheels 14 and/or the rear wheels 16. For example, the source of motive power can be drivingly connected to a drivetrain (not shown) that is operable for transferring torque to the front wheels 14 and/or to the rear wheels 16.

Figure 7:
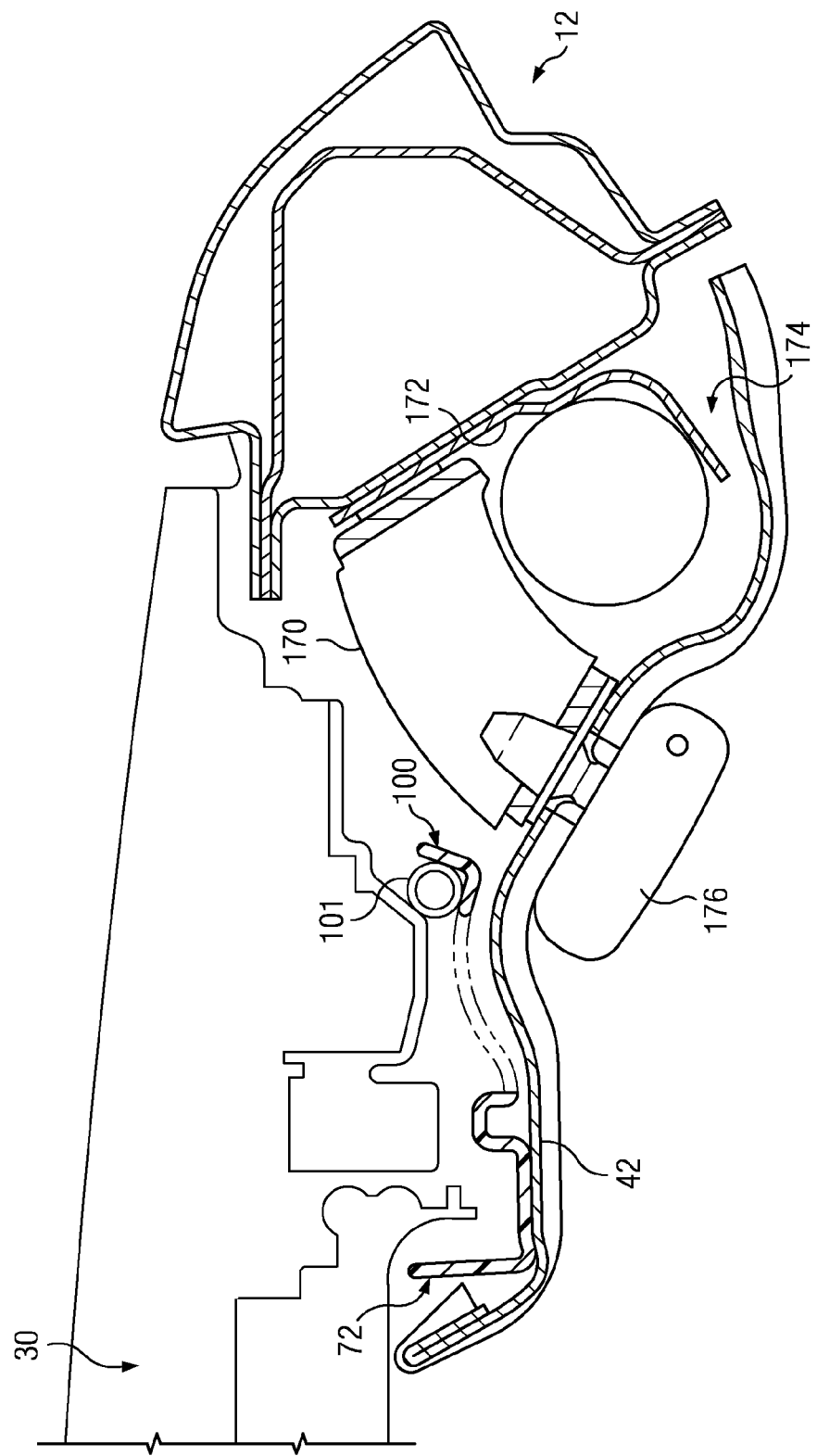
FIG. 7 is a cross-sectional view of the roof liner assembly depicted in FIGS. 2A and 2B in association with certain adjacent structures of the vehicle.

Vehicle 10 can include a sunroof assembly, indicated generally at 30 in FIG. 7, with certain details of the sunroof assembly 30 omitted for clarity of illustration. The sunroof assembly 30 can include a sunroof frame (not shown), which can be attached to a structure of vehicle 10, for example the frame 12 of vehicle 10. The sunroof assembly 30 can further include a sunroof 32 (FIG. 1), which can include one or more glass panels, which can be supported by the sunroof frame.

Figure 2A:
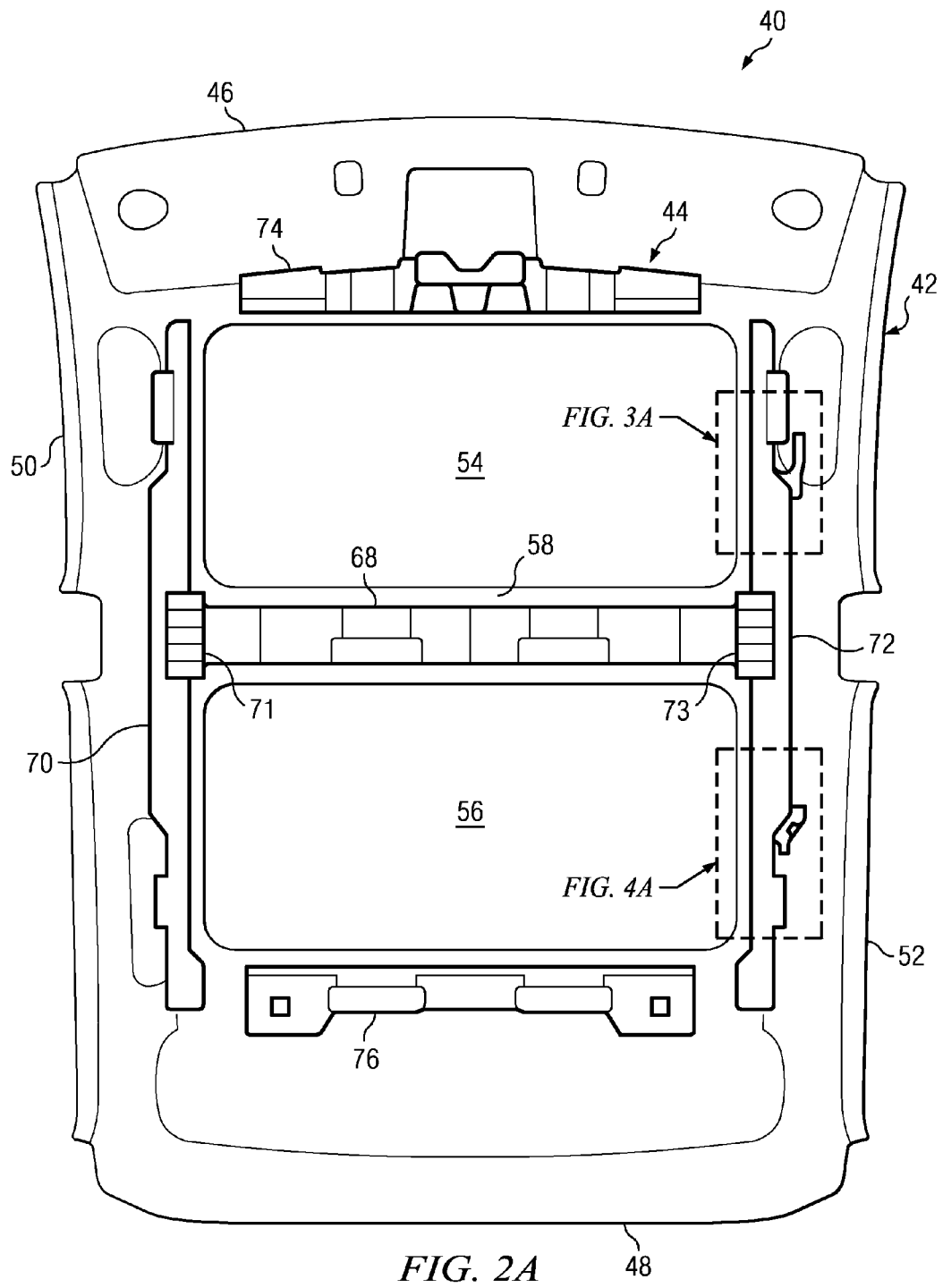
FIG. 2A is a top plan view depicting a roof liner assembly that includes a roof liner and the roof liner stiffener assembly depicted in FIG. 1, with the roof liner stiffener assembly depicted with certain details omitted for clarity of illustration.
Figure 2B:
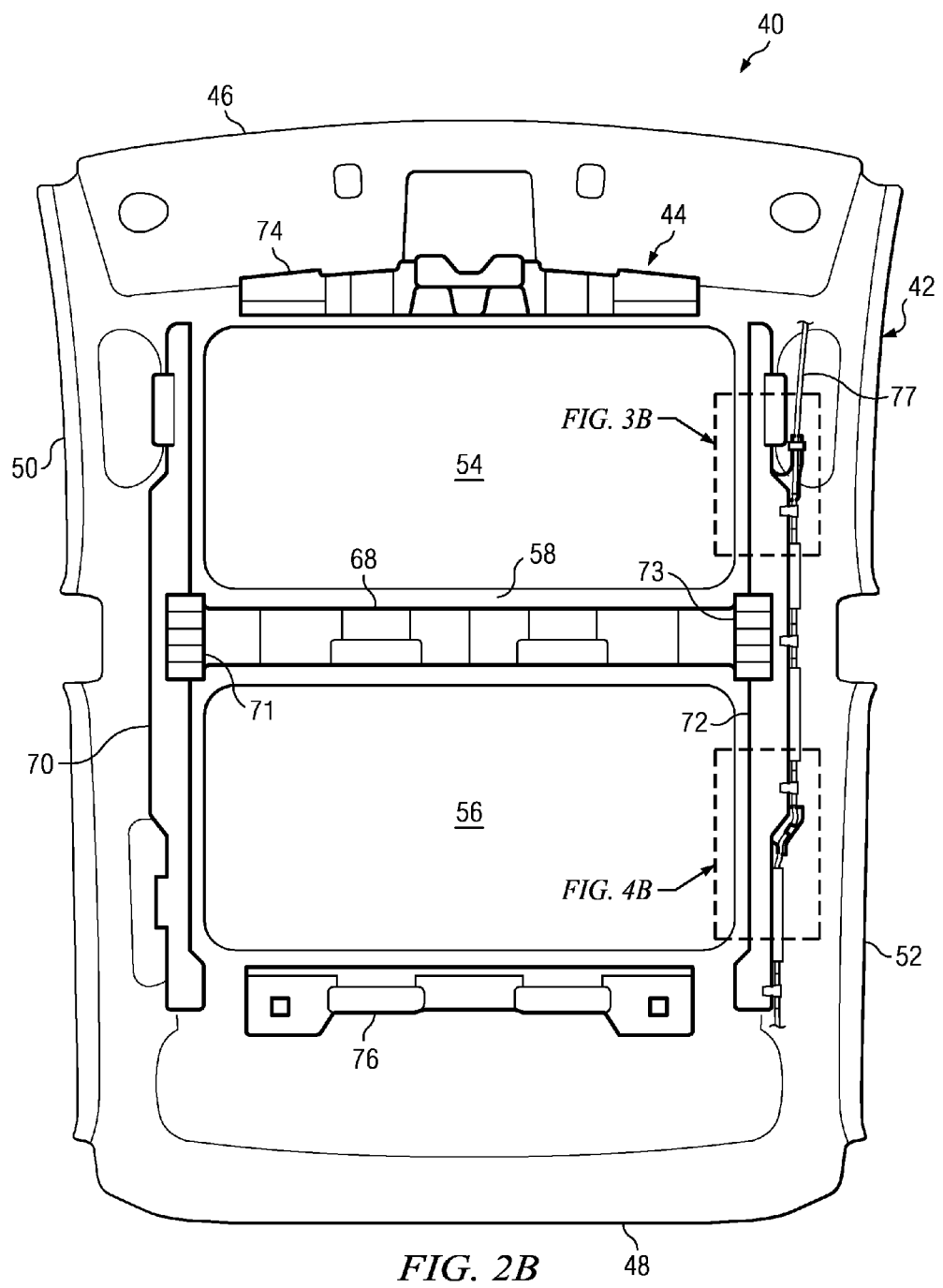
FIG. 2B is a top plan view similar to FIG. 2A, but depicting a fragmentary view of an electrical wiring harness of the vehicle depicted in FIG. 1, supported by and extending along the roof liner stiffener assembly shown in FIGS. 1 and 2A.

Vehicle 10 can include a roof liner assembly, indicated generally at 40 in FIGS. 2A and 2B. The roof liner assembly 40 can include a roof liner 42 and a roof liner stiffener assembly, indicated generally at 44, which can be attached to the roof liner 42. In one embodiment, the roof liner stiffener assembly 44 can be attached to the roof liner 42 using adhesive or any other suitable means of attachment. The roof liner stiffener assembly 44 can also be attached to a structure of vehicle 10, such as the frame (not shown) of the sunroof assembly 30, and/or to frame 12, to provide support and structural rigidity for the roof liner 42. The roof liner 42 can include a front end 46, a rear end 48, a left side 50, and a right side 52. The roof liner 42 can define one or more apertures communicating with a passenger compartment (not shown) of vehicle 10, wherein the apertures can be in selective optical communication with the sunroof 32, for the enjoyment of an occupant seated within the passenger compartment of vehicle 10. For example, in the embodiment of FIGS. 1-7, the roof liner 42 can define a first aperture 54, which can be a front aperture, and a second aperture 56, which can be a rear aperture. Each of the first aperture 54 and the second aperture 56 can communicate with the passenger compartment of vehicle 10 and can be in selective optical communication with the sunroof 32. The roof liner 42 can include a center portion 58 between the first aperture 54 and the second aperture 56. In one embodiment, the roof liner 42 can be made of a composite construction that can include, for example, a fiber material, a layer of foam, and a fabric positioned adjacent the passenger compartment of the vehicle 10. It will be appreciated that in other embodiments, roof liners can be provided that can have configurations different from the configuration of the roof liner 42, and/or that can be made from one or more different materials of construction.

The roof liner stiffener assembly 44 can include a roof liner stiffener 68, which can be a center roof liner stiffener that can be attached to the roof liner 42. The roof liner stiffener assembly 44 can also include a roof liner stiffener 70, which can be a left side roof liner stiffener, and a roof liner stiffener 72, which can be a right side roof liner stiffener. Each of the roof liner stiffeners 70 and 72 can be attached to the roof liner 42. Each of the roof liner stiffeners 68, 70 and 72 can be attached to the roof liner 42 using an adhesive, or any other suitable means of attachment. Each of the roof liner stiffeners 70 and 72 can be attached to the roof liner stiffener 68. In one embodiment, the roof liner stiffener 70 can include a mount flange 71, which can include a plurality of slots (not shown) or other apertures, and the roof liner stiffener 72 can include a mount flange 73, which can include a plurality of slots (not shown) or other apertures. The respective slots, or apertures, of mount flanges 71 and 73 can receive respective upwardly extending pins (not shown) of the roof liner stiffener 68 that can be located on each end of the roof liner stiffener 68, to facilitate attachment of the roof liner stiffener 68 to each of the roof liner stiffeners 70 and 72. It will be appreciated that, in other embodiments, roof liner stiffeners can have different configurations and/or can be attached in any of a variety of other suitable manners. As shown in FIGS. 2A and 2B, the roof liner stiffener 68 can be attached to the center portion 58 of the roof liner 42, and the roof liner stiffeners 70 and 72 can be attached to the roof liner 42 adjacent to the left side 50 and the right side 52, respectively, of the roof liner 42.

The roof liner stiffener assembly 44 can also include a roof liner stiffener 74, which can be a front roof liner stiffener that can be attached to the roof liner 42 adjacent to, and forward of, the first aperture 54 defined by the roof liner 42. The roof liner stiffener assembly 44 can also include a roof liner stiffener 76, which can be a rear roof liner stiffener that can be attached to the roof liner 42 adjacent to, and rearward of, the second aperture 56 defined by the roof liner 42.

The vehicle 10 can include an electrical wiring harness 77, shown partially in FIG. 2B, which can establish electrical communication between various components of vehicle 10. For example, one end of the electrical wiring harness 77 can be in electrical communication with a battery (not shown) of vehicle 10. The electrical wiring harness 77 can be routed upwardly (not shown) along a structure of vehicle 10, for example a front pillar, to a location above the roof liner 42 as shown in FIG. 2B. The electrical wiring harness 77 can then be routed as necessary so as to be in electrical communication with various components of vehicle 10. For example, the electrical wiring harness 77 can be in electrical communication with a rear antenna 66 (FIG. 1) and/or a rear map light (not shown) and/or an active noise cancelling device (not shown). As subsequently described in greater detail, the roof liner stiffener 72 can support and guide the electrical wiring harness 77, and can also provide protection for the electrical wiring harness 77.

Referring to FIGS. 3A, 3B, 4A, 4B, 5 and 6, the roof liner stiffener 72 can include a rail 78, which can be attached to the roof liner 42, for example using an adhesive or any other suitable means of attachment. The rail 78 can include a web 80, and a plurality of ribs 82 integral with the web 80. Ribs 82 can have various sizes and configurations for providing enhanced structural rigidity to the rail 78. The rail 78 can further include a first longitudinally extending flange 84 and a second longitudinally extending flange 86. Each of the longitudinally extending flanges 84, 86 can be integral with the web 80, and can extend upwardly away from the web 80 when the roof liner stiffener 72 is attached to the roof liner 42. At least some of the ribs 82 can extend laterally between the first longitudinally extending flange 84 and the second longitudinally extending flange 86.

The roof liner stiffener 72 can also include a first guide member 100 that can be configured to support a portion of an electrical wiring harness of a vehicle, e.g., a first portion 101 (FIG. 3B) of the electrical wiring harness 77 of vehicle 10, as subsequently described in further detail. The first guide member 100 can include a first base 102 and an elongate arm 104 integral with, and extending away from, the first base 102. The elongate arm 104 can be bendable relative to the base 102. For example the elongate arm 104 can be bent upwardly from a first position shown in solid lines in FIG. 5 to a second position shown in dashed lines in FIG. 5, which can facilitate attaching the first portion 101 of the electrical wiring harness 77 to the first guide member 100 as subsequently described in greater detail. The elongate arm 104 of the first guide member 100 can include a proximal end 106 and a distal end 108. The proximal end 106 of the elongate arm 104 can be integral with the first base 102 of the first guide member 100. It will be appreciated, with reference to FIG. 3A, that the proximal end 106 can be laterally narrower, and can be substantially laterally narrower, than an adjacent portion 103 of the base 102, which can facilitate bending the elongate arm 104 relative to the base 102 in a predictable and controlled manner.

Figure 3A:
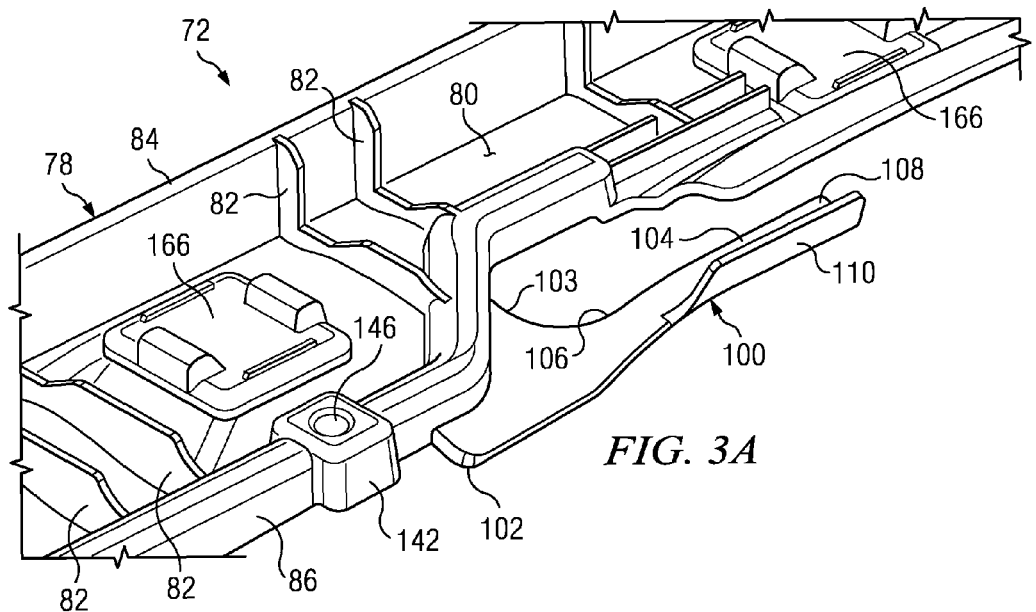
FIG. 3A is an enlarged, top right side perspective view of an encircled portion of FIG. 2A, depicting a portion of a roof liner stiffener of the roof liner stiffener assembly depicted in FIG. 2A, including a first guide member of the roof liner stiffener.
Figure 3B:
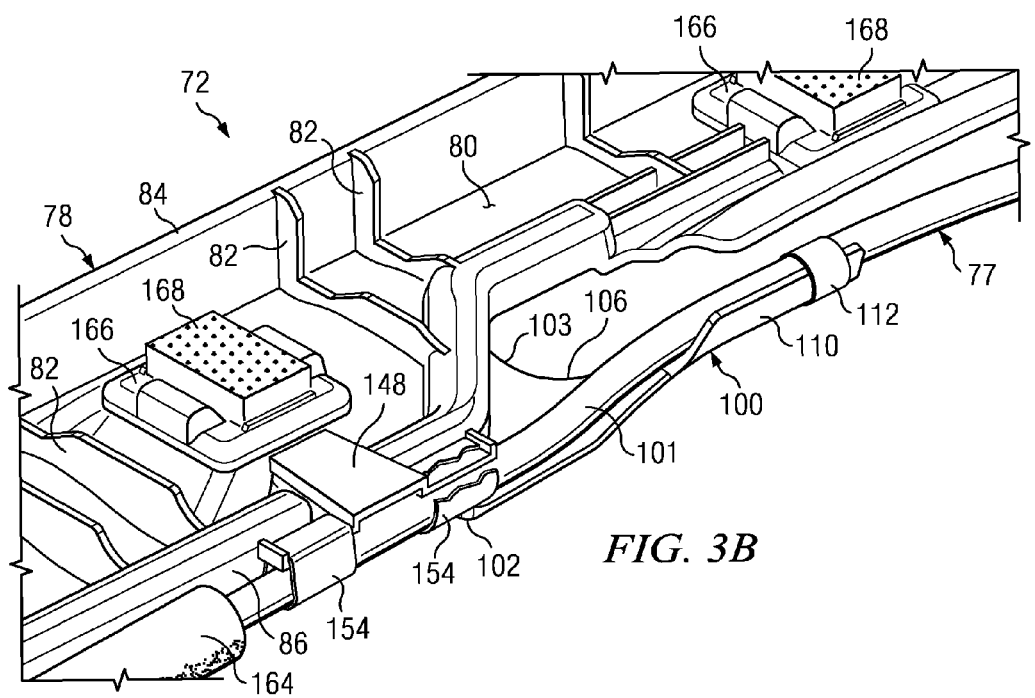
FIG. 3B is an enlarged, top right side perspective view of an encircled portion of FIG. 2B, depicting a first portion of the electrical wiring harness depicted in FIG. 2B supported by the first guide member of the roof liner stiffener.

The first guide member 100 can also include a first flange 110 that can be integral with the elongate arm 104. The first flange 110 can be substantially perpendicular to the elongate arm 104. The first flange 110 can extend longitudinally from the distal end 108 of the elongate arm 104 toward the proximal end 106 of the elongate arm 104. The first flange 110 can be angled relative to the elongate arm 104 such that the elongate arm 104 and the first flange 110 can be configured, in cooperation with one another, to receive and support a portion of an electrical wiring harness of a vehicle, e.g., the first portion 101 of the electrical wiring harness 77 of vehicle 10, as shown in FIG. 3B. As shown in FIG. 3B, the first portion 101 of the electrical wiring harness 77 can be secured to the first guide member 100, for example by taping the first portion 101 of the electrical wiring harness 77 to the first guide member 100 using tape 112.

Figure 4A:
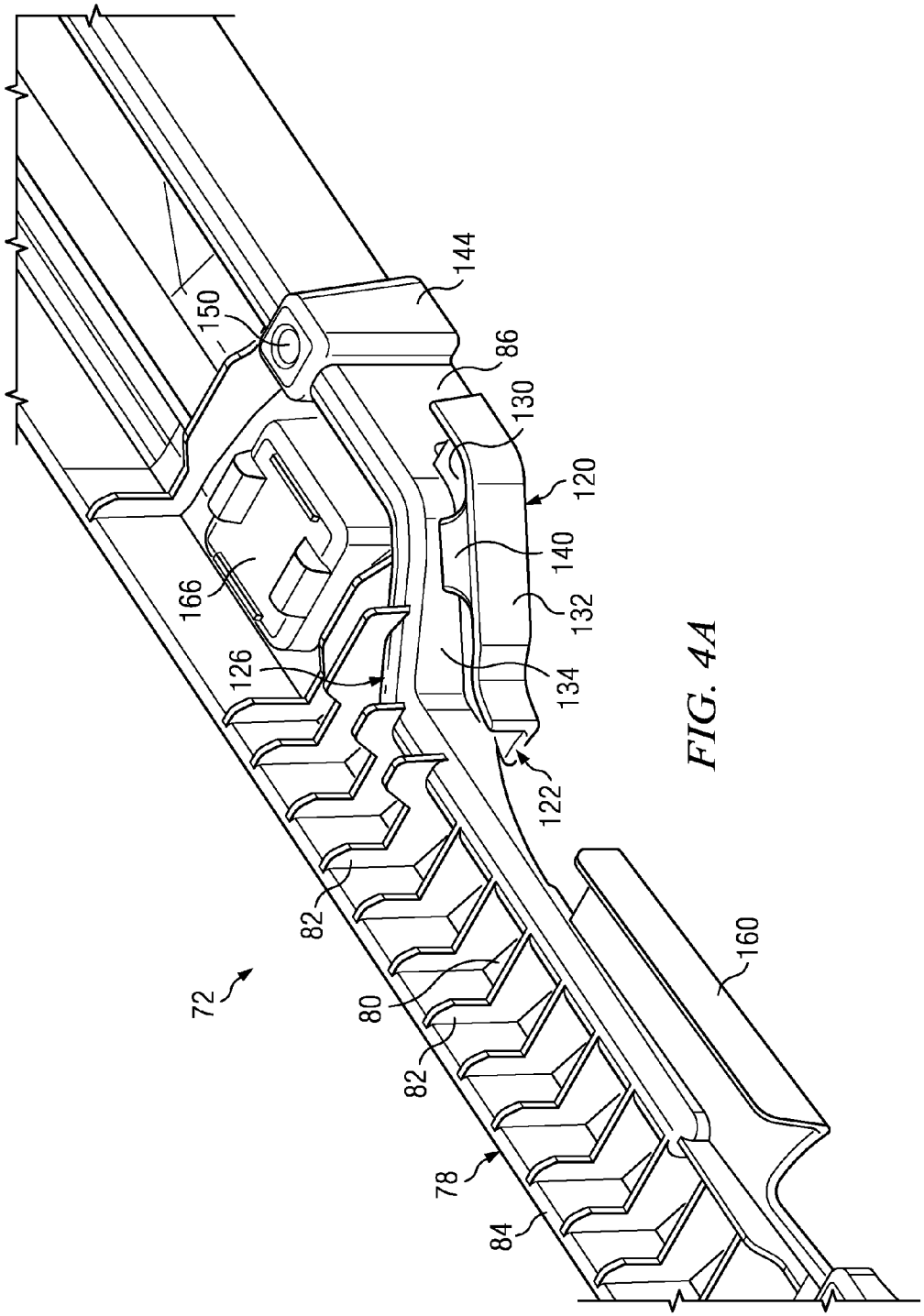
FIG. 4A is an enlarged, top right side perspective view of an encircled portion of FIG. 2A, depicting another portion of the roof liner stiffener depicted in FIG. 2A, including a second guide member of the roof liner stiffener.
Figure 4B:
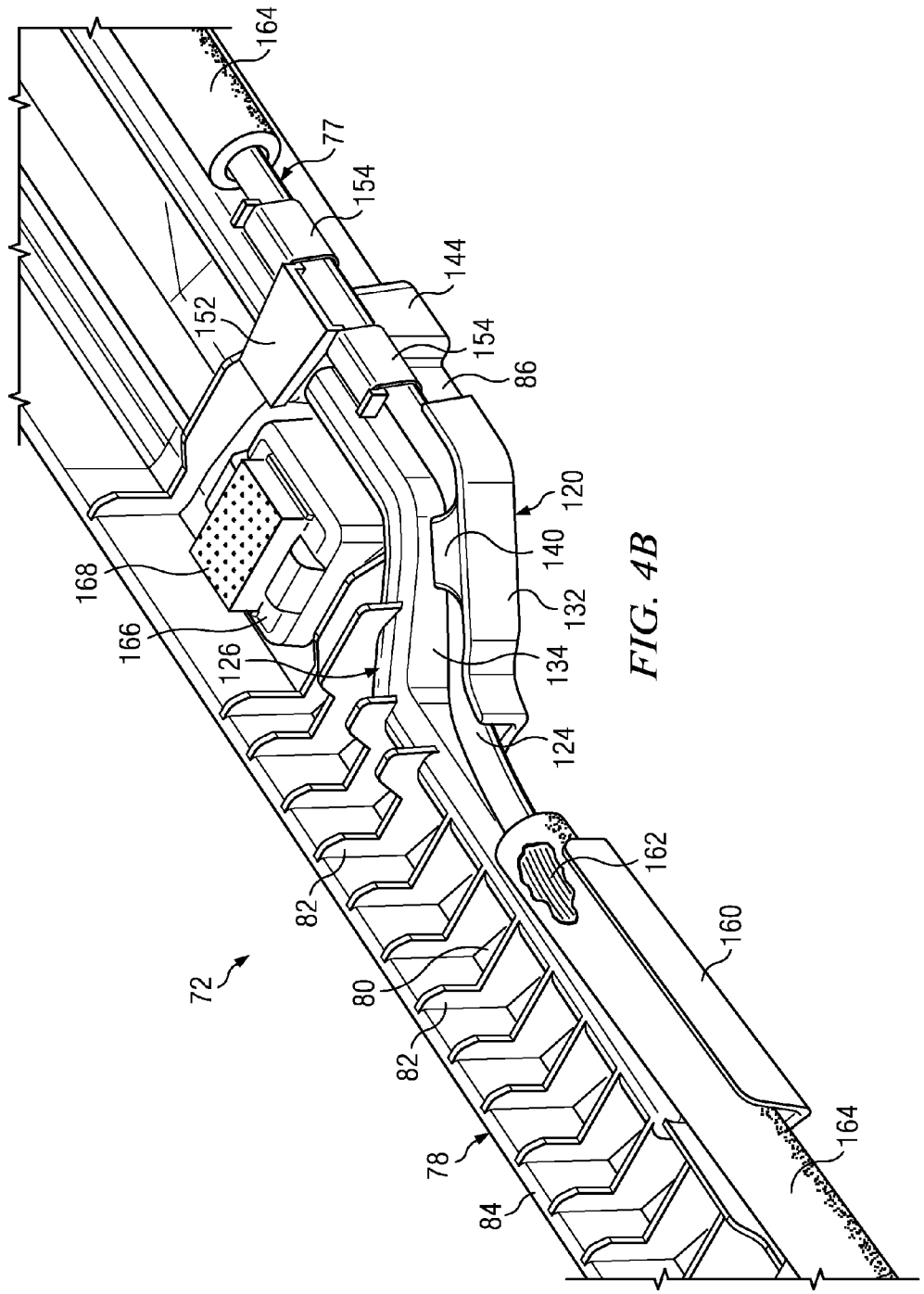
FIG. 4B is an enlarged, top right side perspective of an encircled portion of FIG. 2B, depicting a second portion of the electrical wiring harness depicted in FIG. 2B, supported by the second guide member of the roof liner stiffener.
Figure 5:
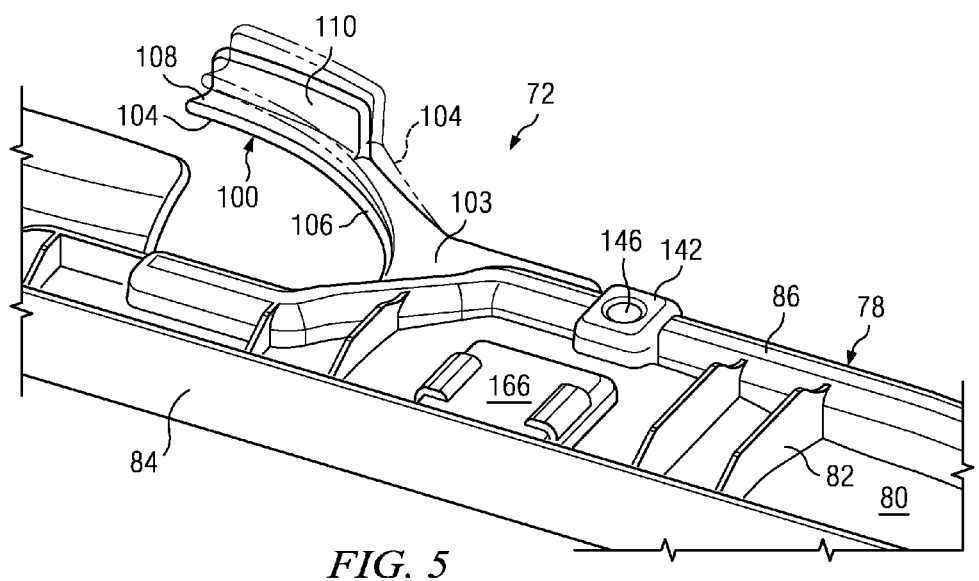
FIG. 5 is an enlarged, top left side perspective view depicting the portion of the roof liner stiffener depicted in FIGS. 3A and 3B.
Figure 6:
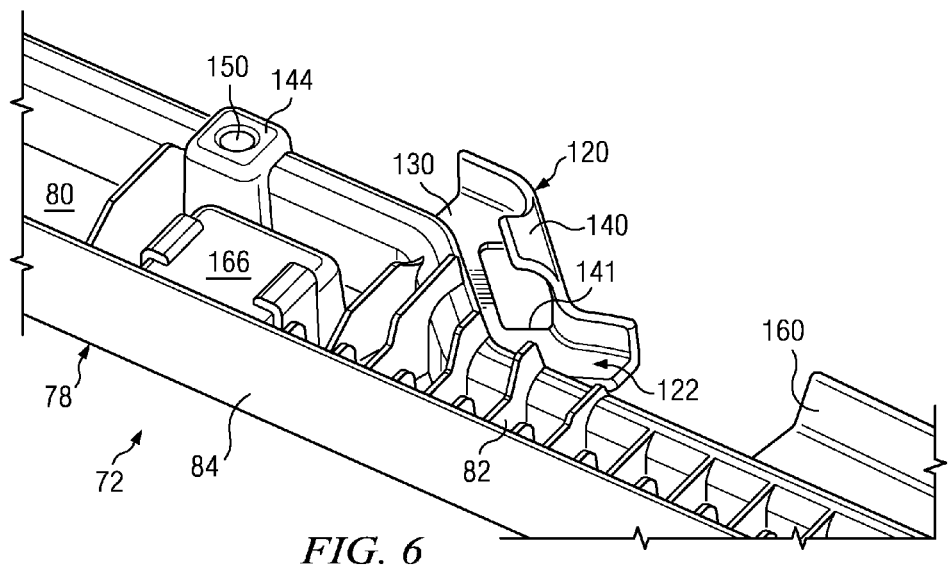
FIG. 6 is an enlarged, top left side perspective view depicting the portion of the roof liner stiffener depicted in FIGS. 4A and 4B.

Referring to FIGS. 4A, 4B and 6, the roof liner stiffener 72 can also include a second guide member 120 that can be integral with the rail 78 of the roof liner 72. The second guide member 120 can be longitudinally spaced from the first guide member 100. The second guide member 120 and the rail 78 can cooperate to define a channel 122 (FIG. 4A) that can be configured to receive a portion of an electrical wiring harness of a vehicle, e.g., a second portion 124 of the electrical wiring harness 77 of vehicle 10, as shown in FIG. 4B.

The second longitudinally extending flange 86 of the rail 78 can include an offset portion 126 (FIGS. 4A and 4B). The second guide member 120 can be integral with the offset portion 126 of the second longitudinally extending flange 86 of the rail 78. The second guide member 120 can include a second base 130 that can be integral with the second longitudinally extending flange 86 of the rail 78. The second guide member 120 can also include a second flange 132 that can be integral with, and transverse to, the second base 130 of the second guide member 120. The second base 130 and the second flange 132 of the second guide member 120 can cooperate with the offset portion 126 of the second longitudinally extending flange 86 of the rail 78 to define the channel 122.

The offset portion 126 of the second longitudinally extending flange 86 of the rail 78 can include an angled portion 134 that extends between laterally spaced, or offset portions of the second longitudinally extending flange 86. The offset portion 126 can have a first shape and, as shown in FIGS. 4A, 4B and 6, the second flange 132 of the second guide member 120 can be laterally spaced from the second longitudinally extending flange 86 of the rail 78, and can have a second shape that can be complementary with the first shape of the offset portion 126 of the second longitudinally extending flange 86 of the rail 78. As a result, the second guide member 120 can be configured to guide a portion of an electrical wiring harness of a vehicle, e.g., the second portion 124 of the electrical wiring harness 77 of vehicle 10, generally longitudinally alongside the offset portion 126 of the second longitudinally extending flange 86 of the rail 78, as shown in FIG. 4B. In this manner, the second guide member can assist in changing the direction of the electrical wiring harness 77 as desired.

The second guide member 120 can also include an arcuate tab 140 that can facilitate retaining the second portion 124 of the electrical wiring harness 77 within channel 122. The arcuate tab 140 can be integral with the second flange 132 of the second guide member 120, can be spaced from the second base 130, and can extend from the second flange 132 toward the second longitudinally extending flange 86 of the rail 78. The second base 130 can define an aperture 141, which can facilitate forming the arcuate tab 140, as part of the second guide member 120, with less expensive tooling than would otherwise be required for the roof liner stiffener 72.

The rail 78, the first guide member 100, and the second guide member 120 of the roof liner stiffener 72 can be integrally formed from a suitable thermoplastic material, using a suitable molding process, as a unitary structure. In one embodiment, the rail 78, the first guide member 100, and the second guide member 120 can be integrally molded from polypropylene as a unitary structure, using an injection molding process. It will be appreciated that in some embodiments, thermoplastic materials can be used that exhibit shape memory characteristics, and in other embodiments, thermoplastic materials can be used that may not exhibit shape memory characteristics. Other components of the roof liner stiffener 72, e.g., ribs 82, and other subsequently described components, can also be integrally molded as part of the unitary structure.

The electrical wiring harness 77 can be further secured to the roof liner stiffener 72 using clips and tape. In the embodiment of FIGS. 1-7, the roof liner stiffener can include a plurality of mount bosses configured to receive respective clips. For example, the roof liner stiffener 72 can include a first mount boss 142, which can be positioned adjacent to the first guide member 100 as shown in FIG. 3A, and can further include a second mount boss 144, which can be positioned adjacent the second guide member 120 as shown in FIG. 4A. The first mount boss 142 can define a first aperture 146 that can be configured to receive a clip, e.g., a first clip 148 (FIG. 3B). The second mount boss 144 can define a second aperture 150 that can be configured to receive a clip, e.g., a second clip 152 (FIG. 4B). Portions of the electrical wiring harness 77 can be taped to the first clip 148 and the second clip 152, for example using tape 154 as shown in FIGS. 3B and 4B. Other quantities and/or locations of mount bosses, clips and tape can also be used to further secure the electrical wiring harness 77 to the roof liner stiffener 72.

The roof liner stiffener 72 can also include a third guide member 160 (FIGS. 4A and 4B), which can also support a portion of an electrical wiring harness of a vehicle, for example a third portion 162 of the electrical wiring harness 77 of vehicle 10, as shown in FIG. 4B. Foam tape, such as foam tape 164, can be positioned around various portions of the electrical wiring harness 77 for rattle/squeak noise prevention, as shown in FIGS. 3B and 4B. The mount bosses 142, 144, as well as other mount bosses, and the third guide member 160, can also be integrally formed as part of the unitary structure. The roof liner stiffener 72 can also include a plurality of pads, e.g., a plurality of pads 166 that can be integrally formed as part of the unitary structure. The roof liner stiffener assembly 44 can include a plurality of attachment pads, such as a plurality of attachment pads 168 shown in FIGS. 3B and 4B, with each of the pads 168 secured to a respective pad 166 of the roof liner stiffener 72. Each of the attachment pads 168 can include a hook portion, or a loop portion, of a hook and loop fastener arrangement. Mating portions of respective hook and loop fastener arrangements can be attached to a structure of vehicle 10, such as the frame (not shown) of the sunroof assembly 30 and/or to frame 12, to facilitate attaching the roof liner stiffener 72 to the structure of the vehicle 10, such as the frame of the sunroof assembly 30 and/or frame 12. Other roof liner stiffeners of the roof liner stiffener assembly 44 can be attached to a structure of vehicle 10, such as the sunroof assembly frame and/or frame 12 in a similar manner. It will be appreciated that screws or other fasteners can alternatively, or additionally, be used to attach a roof liner stiffener assembly, e.g., the roof liner stiffener assembly 44, and/or a roof liner, e.g., the roof liner 42, to a vehicle structure such as a sunroof assembly frame and/or a vehicle frame, such as the frame of sunroof assembly 30 and/or the frame 12 of vehicle 10.

The first guide member 100 and the second guide member 120 can support the electrical wiring harness 77 and can also protect the electrical wiring harness 77 from potential damage caused by adjacent parts of vehicle 10, during the installation of the roof liner assembly 44, e.g., during assembly of the roof liner stiffener assembly 44 to the sunroof frame (not shown). The configuration of the first guide member 100 and the second guide member 120 can also facilitate the attachment of the electrical wiring harness 77 to the roof liner stiffener 72. For example, as shown in FIG. 7, the roof liner stiffener 72 can be attached to the roof liner 42 at a location adjacent to a grabrail bracket 170 that can be attached at one end to a support structure, such as a frame 172 of a side air bag assembly 174, and can be attached at an opposite end to a grabrail 176 that can extend into the passenger compartment of vehicle 10. The elongate arm 104 of the first guide member 100 can be bent upwardly, away from the roof liner 42, to facilitate taping the first portion 101 of electrical wiring harness 77 to the first guide member 100, while avoiding inadvertent contact with adjacent structures, such as the grabrail bracket 170, during the taping process. Additionally, the configurations of the first guide member 100 and the second guide member 120 can facilitate routing the electrical wiring harness 77 along a desired path. This routing can be further facilitated since the first guide member 100 and the second guide member 120 can be integrally formed with the rail 78 as a unitary structure, which can provide enhanced accuracy in locating the first guide member 100 and the second guide member 120, which in turn can result in enhanced accuracy in positioning the electrical wiring harness 77, while permitting a flexible electrical wiring harness to be used, e.g., the electrical wiring harness 77. This facilitates taping, and otherwise securing, of the electrical wiring harness 77 to the roof liner stiffener 72 for efficient and cost effective assembly.

While the first guide member 100 and the second guide member 120 have been illustrated as part of the roof liner stiffener 72, which is shown to be a right side roof liner stiffener in the embodiment of FIGS. 1-7, it will be appreciated that guide members can be provided, for protecting, supporting and guiding an electrical wiring harness of a vehicle, in association with roof liner stiffeners having other orientations with respect to a roof liner of a vehicle and/or having other configurations.

While various embodiments of a roof liner stiffener, a roof liner stiffener assembly, and a vehicle, have been described in considerable detail, it is not intended to restrict or in any way limit the scope of the appended claims to such detail. Additional modifications will be readily apparent to those skilled in the art.

What is claimed is:

1. A roof liner stiffener for a vehicle, the roof liner stiffener comprising:
   a rail configured for attachment to a roof liner of a vehicle, the rail comprising a web and a plurality of ribs integral with the web;
   a first guide member configured to support a first portion of an electrical wiring harness of a vehicle; and
   a second guide member longitudinally spaced from the first guide member, the second guide member and the rail cooperating to define a channel configured to receive a second portion of an electrical wiring harness of a vehicle; wherein
   the rail, the first guide member, and the second guide member are integrally formed from a thermoplastic material as a unitary structure;
   the first guide member comprises a first base and an elongate arm integral with, and extending away from, the first base; and
   the elongate arm of the first guide member is bendable relative to the first base of the first guide member.

2. A roof liner stiffener for a vehicle, the roof liner stiffener comprising:
   a rail configured for attachment to a roof liner of a vehicle, the rail comprising a web and a plurality of ribs integral with the web; and
   a first guide member configured to support a first portion of an electrical wiring harness of a vehicle, the rail and the first guide member being integrally formed from a thermoplastic material as a unitary structure; wherein
   the first guide member comprises a first base and an elongate arm integral with, and extending away from, the first base
   the elongate arm of the first guide member is bendable relative to the first base of the first guide member;
   the elongate arm of the first guide member comprises a proximal end and a distal end, the proximal end being integral with the first base of the first guide member;
   the first guide member further comprises a first flange integral with the elongate arm and extending longitudinally from the distal end of the elongate arm toward the proximal end of the elongate arm; and
   the first flange is angled relative to the elongate arm such that the elongate arm and the first flange are configured, in cooperation with one another, to receive and support a first portion of an electrical wiring harness of a vehicle.

3. The roof liner stiffener of claim 2, wherein:
   the first flange of the first guide member is substantially perpendicular to the elongate arm of the first guide member.

4. The roof liner stiffener of claim 2, wherein:
   the proximal end of the elongate arm is laterally narrower than an adjacent portion of the first base.

5. The roof liner stiffener of claim 2, further comprising:
   a second guide member; wherein:
   the second guide member is integral with the rail and longitudinally spaced from the first guide member;
   the second guide member and the rail cooperate to define a channel configured to receive a second portion of an electrical wiring harness of a vehicle; and
   the second guide member is integrally formed as part of the unitary structure.

6. The roof liner stiffener of claim 5, wherein:
   the rail further comprises a first longitudinally extending flange and a second longitudinally extending flange, each of the first and second longitudinally extending flanges being integral with the web of the rail;
   the second longitudinally extending flange of the rail comprises an offset portion, the second guide member being integral with the offset portion of the second longitudinally extending flange of the rail; and
   the second guide member is configured to guide a second portion of an electrical wiring harness of a vehicle generally longitudinally alongside the offset portion of the second longitudinally extending flange of the rail.

7. The roof liner stiffener of claim 6, wherein:
   the second guide member comprises a second base integral with the second longitudinally extending flange of the rail;
   the second guide member further comprises a second flange integral with, and transverse to, the second base of the second guide member;
   the offset portion of the second longitudinally extending flange of the rail comprises a first shape; and
   the second flange of the second guide member is laterally spaced from the second longitudinally extending flange of the rail and comprises a second shape, the second shape being complementary with the first shape of the offset portion of the second longitudinally extending flange of the rail.

8. The roof liner stiffener of claim 7, wherein:
   the second guide member further comprises an arcuate tab; and the arcuate tab is integral with the second flange of the second guide member, spaced from the second base of the second guide member, and extends from the second flange of the second guide member toward the second longitudinally extending flange of the rail.

9. The roof liner stiffener of claim 5, wherein:
the rail further comprises a first mount boss adjacent to the first guide member, the first mount boss defining a first aperture configured to receive a first clip.

10. The roof liner stiffener of claim 9, wherein:
the rail further comprises a second mount boss adjacent to the second guide member, the second mount boss defining a second aperture configured to receive a second clip.

11. The roof liner stiffener of claim 6, wherein:
at least some of the ribs of the rail extend laterally between the first longitudinally extending flange and the second longitudinally extending flange of the rail.

12. A roof liner assembly for a vehicle, the roof liner assembly comprising:
a roof liner; and
a roof liner stiffener assembly attached to the roof liner; wherein
the roof liner stiffener assembly comprises a roof liner stiffener;
the roof liner stiffener comprises a rail attached to the roof liner, the rail comprising a web and a plurality of ribs integral with the web;
the roof liner stiffener further comprises a first guide member configured to support a first portion of an electrical wiring harness of a vehicle, and a second guide member longitudinally spaced from the first guide member, the second guide member and the rail cooperating to define a channel configured to receive a second portion of an electrical wiring harness of a vehicle;
the rail, the first guide member, and the second guide member are integrally formed from a thermoplastic material as a unitary structure;
the first guide member comprises a first base and an elongate arm integral with, and extending away from, the first base; and
the elongate arm of the first guide member is bendable relative to the first base of the first guide member.

13. A roof liner assembly for a vehicle, the roof liner assembly comprising:
a roof liner; and
a roof liner stiffener assembly attached to the roof liner; wherein
the roof liner stiffener assembly comprises a roof liner stiffener;
the roof liner stiffener comprises a rail attached to the roof liner, the rail comprising a web and a plurality of ribs integral with the web;
the roof liner stiffener further comprises a first guide member configured to support a first portion of an electrical wiring harness of a vehicle the rail and the first guide member being integrally formed from a thermoplastic material as a unitary structure;
the first guide member comprises a first base and an elongate arm integral with, and extending away from, the first base;
the elongate arm of the first guide member is bendable relative to the first base of the first guide member;
the elongate arm of the first guide member of the roof liner stiffener comprises a proximal end and a distal end, the proximal end being integral with the first base of the first guide member;
the first guide member further comprises a first flange integral with the elongate arm and extending longitudinally from the distal end of the elongate arm toward the proximal end of the elongate arm; and
the first flange is angled relative to the elongate arm such that the elongate arm and the first flange are configured, in cooperation with one another, to receive and support a first portion of an electrical wiring harness of a vehicle.

14. The roof liner assembly of claim 13, wherein:
the roof liner stiffener of the roof liner stiffener assembly further comprises a second guide member;
the second guide member is integral with the rail of the roof liner stiffener and longitudinally spaced from the first guide member;
the second guide member and the rail cooperate to define a channel configured to receive a second portion of an electrical wiring harness of a vehicle; and
the second guide member is integrally formed as part of the unitary structure.

15. The roof liner assembly of claim 14, wherein:
the rail of the roof liner stiffener of the roof liner stiffener assembly further comprises a first longitudinally extending flange and a second longitudinally extending flange, each of the first and second longitudinally extending flanges being integral with the web of the rail:
the second longitudinally extending flange of the rail comprises an offset portion, the second guide member being integral with the offset portion of the second longitudinally extending flange of the rail; and
the second guide member of the roof liner stiffener is configured to guide a second portion of an electrical wiring harness of a vehicle longitudinally alongside the offset portion of the second longitudinally extending flange of the rail.

16. The roof liner assembly of claim 13, wherein:
the roof liner stiffener of the roof liner stiffener assembly comprises a right side roof liner stiffener;
the roof liner stiffener assembly further comprises a left side roof liner stiffener and a center roof liner stiffener; and
the center roof liner stiffener is attached to the roof liner and is attached to each of the right side roof liner stiffener and the left side roof liner stiffener.

17. The roof liner assembly of claim 16, wherein:
the roof liner comprises a right side, a left side and a center portion;
the roof liner defines a front aperture and a rear aperture spaced from the front aperture, each of the front aperture and the rear aperture being configured for selective optical communication with a sunroof of a vehicle;
the center roof liner stiffener of the roof liner stiffener assembly is attached to the center portion of the roof liner and is positioned between the front aperture and the rear aperture defined by the roof liner; and
the right side roof liner stiffener is attached to the roof liner adjacent the right side of the roof liner and the left side roof liner stiffener is attached to the roof liner adjacent the left side of the roof liner.

18. The roof liner assembly of claim 17, wherein:
the roof liner stiffener assembly further comprises a front roof liner stiffener and a rear roof liner stiffener; and
each of the front roof liner stiffener and the rear roof liner stiffener is attached to the roof liner and is spaced from the center roof liner stiffener.

19. A vehicle comprising:
a roof liner;
a roof liner stiffener assembly attached to the roof liner;

an electrical component; and an electrical wiring harness, the electrical wiring harness being in electrical communication with the electrical component; wherein the roof liner stiffener assembly comprises a roof liner stiffener;

the roof liner stiffener comprises a rail attached to the roof liner, the rail comprising a web and a plurality of ribs integral with the web;

the roof liner stiffener further comprises a first guide member, the first guide member supporting a first portion of the electrical wiring harness, the rail and the first guide member being integrally formed from a thermoplastic material as a unitary structure;

the first guide member comprises a first base and an elongate arm integral with, and extending away from, the first base; and the elongate arm of the first guide member is bendable relative to the first base of the first guide member.

20. The vehicle of claim 19, wherein:

the elongate arm of the first guide member comprises a proximal end and a distal end, the proximal end being integral with the first base of the first guide member; and the first guide member further comprises a first flange integral with the elongate arm and extending longitudinally from the distal end of the elongate arm toward the proximal end of the elongate arm; and the first flange is angled relative to the elongate arm such that the elongate arm and the first flange are configured, in cooperation with one another, to receive and support the first portion of the electrical wiring harness.

21. The vehicle of claim 20, wherein:

the roof liner stiffener of the roof liner stiffener assembly further comprises a second guide member;

the second guide member is integral with the rail of the roof liner stiffener and longitudinally spaced from the first guide member;

the second guide member and the rail cooperate to define a channel, the channel receiving a second portion of the electrical wiring harness; and the second guide member is integrally formed as part of the unitary structure.

22. The vehicle of claim 21, wherein:

the rail of the roof liner stiffener of the roof liner stiffener assembly further comprises a first longitudinally extending flange and a second longitudinally extending flange, each of the first and second longitudinally extending flanges being integral with the web of the rail;

the second longitudinally extending flange of the rail comprises an offset portion, the second guide member being integral with the offset portion of the second longitudinally extending flange of the rail; and the second guide member of the roof liner stiffener guides the second portion of the electrical wiring harness generally longitudinally alongside the offset portion of the second longitudinally extending flange of the rail.

23. The vehicle of claim 19, wherein:

the roof liner stiffener of the roof liner stiffener assembly comprises a right side roof liner stiffener;

the roof liner stiffener assembly further comprises a left side roof liner stiffener and a center roof liner stiffener; and the center roof liner stiffener is attached to the roof liner and is attached to each of the right side roof liner stiffener and the left side roof liner stiffener.

24. The vehicle of claim 23, wherein;

the roof liner comprises a right side, a left side and a center portion;

the roof liner defines a first aperture and a second aperture spaced from the first aperture;

the center roof liner stiffener of the roof liner stiffener assembly is attached to the center portion of the roof liner and is positioned between the front aperture and the rear aperture of the roof liner; and the roof liner further comprises a right side and a left side, and wherein the right side roof liner stiffener is attached to the roof liner adjacent the right side of the roof liner, and the left side roof liner stiffener is attached to the roof liner adjacent the left side of the roof liner.

25. The vehicle of claim 24, wherein:

the first aperture comprises a front aperture and the second aperture comprises a rear aperture;

the roof liner stiffener assembly further comprises a front roof liner stiffener and a rear roof liner stiffener; and each of the front roof liner stiffener and the rear roof liner stiffener is attached to the roof liner and each is spaced from the center roof liner stiffener;

the front roof liner stiffener is attached to the roof liner forward of the front aperture defined by the roof liner; and the rear roof liner stiffener is attached to the roof liner rearward of the rear aperture defined by the roof liner.

26. The vehicle of claim 21, wherein:

the roof liner stiffener assembly further comprises a plurality of clips;

the rail of the roof liner stiffener further comprises a first mount boss adjacent to the first guide member, and a second mount boss adjacent to the second guide member;

the first mount boss defines a first aperture and the second mount boss defines a second aperture, the first aperture receiving a first one of the clips, the second aperture receiving a second one of the clips; and the electrical wiring harness is secured to each of the first and second clips.

* * * * *

UNITED STATES PATENT AND TRADEMARK OFFICE
CERTIFICATE OF CORRECTION

PATENT NO. : 8,297,691 B2
APPLICATION NO. : 12/755641
DATED : October 30, 2012
INVENTOR(S) : Huth et al.

Page 1 of 1

It is certified that error appears in the above-identified patent and that said Letters Patent is hereby corrected as shown below:

Claim 2, column 8, line 7, change "base" to --base;--;
Claim 13, column 9, line 55, change "vehicle" to --vehicle,--;
Claim 15, column 10, line 25, change "rail:" to --rail;--; and
Claim 24, column 12, line 12, change "wherein;" to --wherein:--.

Signed and Sealed this
Fifth Day of February, 2013

Teresa Stanek Rea
*Acting Director of the United States Patent and Trademark Office*